Nov. 2, 1937. H. C. OTIS Re. 20,546
WELL TOOL
Original Filed Dec. 1, 1930 3 Sheets-Sheet 1
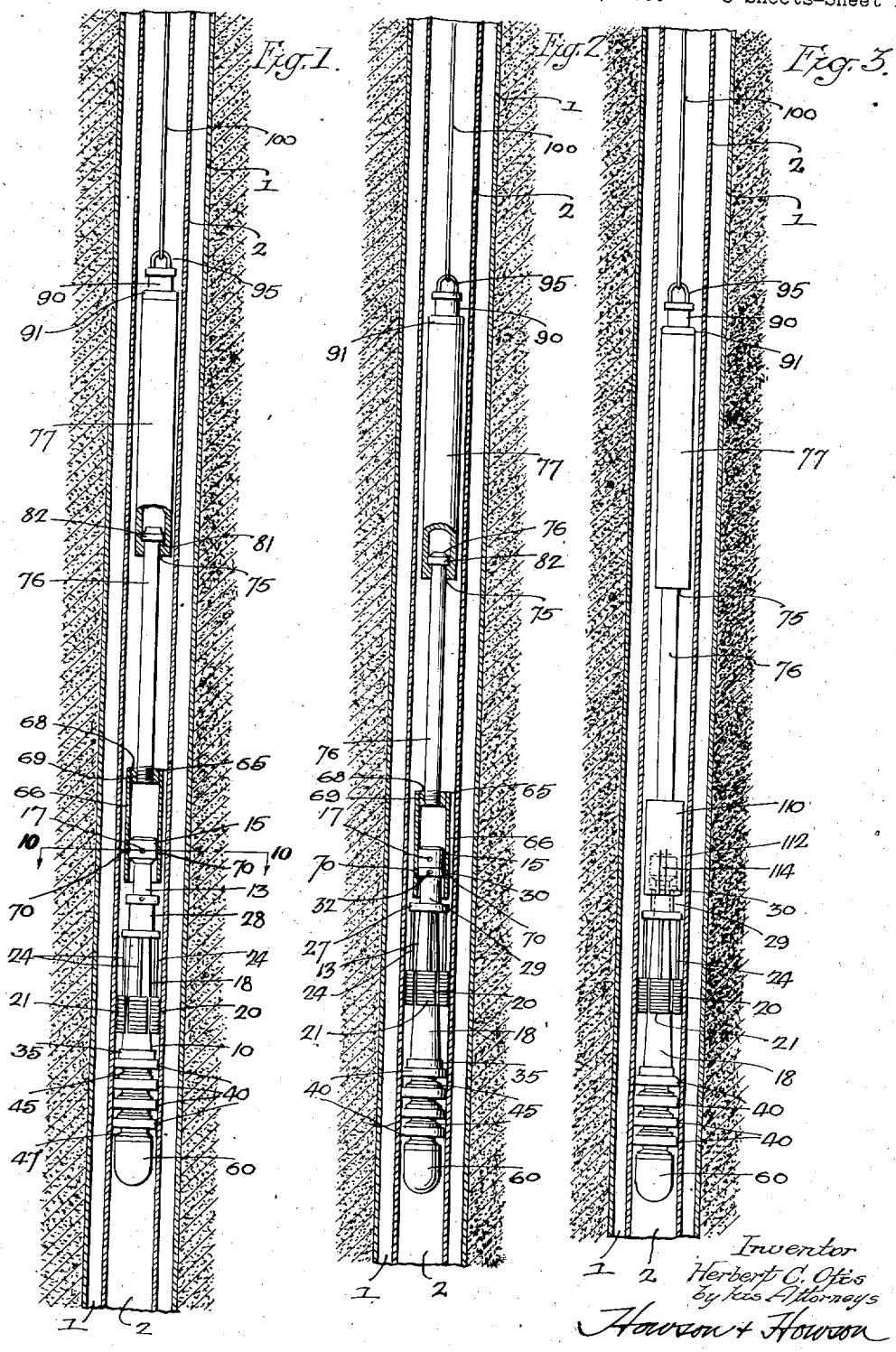

Nov. 2, 1937. H. C. OTIS Re. 20,546
WELL TOOL
Original Filed Dec. 1, 1930 3 Sheets-Sheet 2
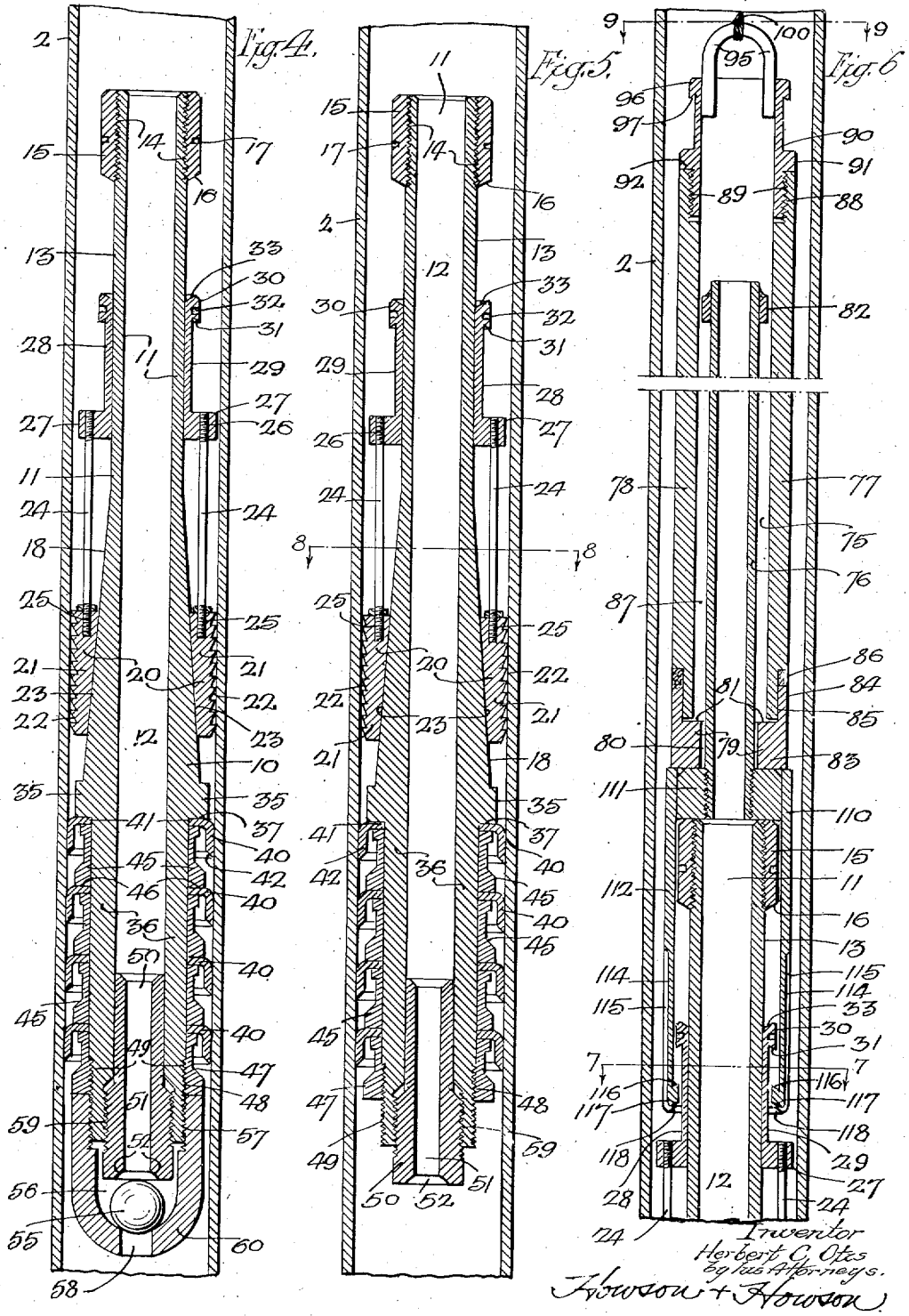

Nov. 2, 1937. H. C. OTIS Re. 20,546
WELL TOOL
Original Filed Dec. 1, 1930 3 Sheets-Sheet 3
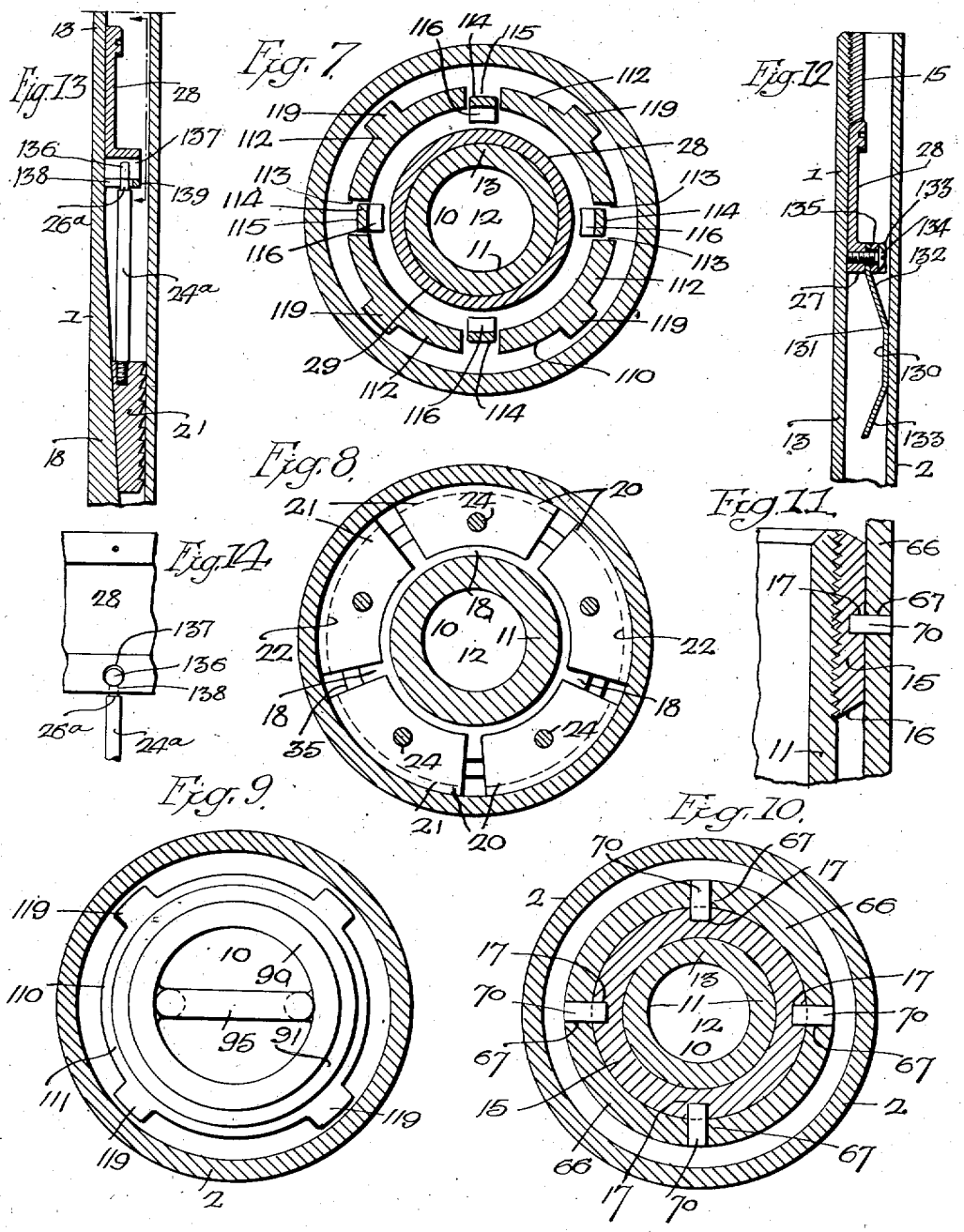
Inventor
Herbert C. Otis
by his Attorneys
Howson & Howson Reissued Nov. 2, 1937

Re. 20,546

UNITED STATES PATENT OFFICE 20,546

WELL TOOL

Herbert C. Otis, Dallas, Tex.

Original No. 1,920,103, dated July 25, 1933, Serial No. 499,372, December 1, 1930. Application for reissue June 7, 1935, Serial No. 26,671

30 Claims. (Cl. 166—13)

This invention relates to an obstructive device adapted for use as either a plug or choke for a string of tubing located within the casing of a flowing oil well operating under high pressure, in order that the string of tubing may be withdrawn completely from the well casing, or shifted longitudinally within the well casing to change the position of the inlet or screen section of the tubing relative to the bottom of the well.

Experience has proven that the position of the inlet or screen section of a string of tubing, with respect to the bottom of the well in which the tubing is set, frequently affects the oil and gas production of a flowing oil well operating under high pressure; and that by raising or lowering the string of tubing a short distance in the well the production of both oil and gas may be varied materially.

One object of the present invention is to provide a practical and efficient device capable of being used as a tubing seal, or as a tubing choke, which may be readily set at any desired place in the string of tubing either to completely seal off said tubing or to reduce the flow whereby the string may be shifted longitudinally in the casing or the tubing entirely removed from the casing; and which device may be readily removed from the string of tubing without "pulling" the string of tubing.

Another object of the invention is to provide an actuating device in conjunction with a setting tool or with a pulling tool, co-operating with the obstructive device, whereby the obstructive device may be lowered into or removed from the string of tubing and whereby the sealing or choking device may be set in the tubing or released therefrom.

Other objects of the invention and the construction of the device, in detail, will be fully disclosed hereinafter, reference being had to the accompanying drawings, of which:

Fig. 1 is a longitudinal sectional elevation through a portion of a well casing showing a string of tubing set within the casing; and the assembled actuating, setting and obstructive devices as being lowered within the said string of tubing;

Fig. 2 is a view similar to Fig. 1, but showing an alternative manner of attaching the setting and actuating device to the obstructive device;

Fig. 3 is a view similar to Fig. 1, but showing the obstructive device as being withdrawn from the string of tubing by use of a pulling device interposed between the actuating and obstructive devices;

Fig. 4 is a longitudinal sectional elevation, drawn on an enlarged scale, showing the obstructive device being used as a temporary seal, for the string of tubing;

Fig. 5 is a view similar to Fig. 4, but showing certain elements of the obstructive device removed to cause the obstructive device to function as a choke for the string of tubing;

Fig. 6 is a view similar to either Fig. 4 or Fig. 5, and showing the pulling and actuating devices in operative position with respect to the obstructive device, to effect release of the obstructive device from the wall of the string of tubing, to permit the obstructive device to be removed from the string of tubing;

Fig. 7 is a sectional plan view taken on the line 7—7, Fig. 6;

Fig. 8 is a sectional plan view taken on the line 8—8, Fig. 5;

Fig. 9 is a sectional plan view taken on the line 9—9, Fig. 6;

Fig. 10 is a sectional plan view taken on the line 10—10, Fig. 1;

Fig. 11 is a vertical sectional view showing the shearing plug; and

Figs. 12, 13 and 14 illustrate modified forms of details of the invention.

Referring to Figs. 1, 2 and 3 of the drawings, a portion of a well casing is indicated at 1. Within the casing 1 is located a string of tubing 2, and within the string of tubing 2 is located an obstructive device 10, which forms the subject of the present invention.

The obstructive device 10, see Fig. 4, comprises a mandrel 11 having a central axial bore 12 extending completely through the mandrel from end to end thereof. The mandrel 11 comprises an upper straight walled cylindrical section 13 threaded at 14, adjacent its upper end, for the reception of an externally disposed collar 15. The lower edge of the collar 15 is beveled, as indicated at 16, for purposes hereinafter set forth. The collar 15 is provided with a plurality of openings 17, 17, for purposes hereinafter set forth.

Below the cylindrical section 13, the mandrel 11 is provided with a frusto-conical section 18, around which is disposed a longitudinally split gripping element 20, composed of a plurality of independent segmental slip sections or dogs 21. Each of the slip sections 21 is provided on its outer peripheral surface with a plurality of annular teeth 22 which are adapted to engage the inner surface of the string of tubing 2, to maintain the obstructive device 10 in a predetermined position within the string of tubing 2.

The inner surfaces 23 of the assembled segmental sections 21, of the gripping element 20, taper in accordance with the taper of the external surface of the frusto-conical section 18 of the mandrel 11, so that, upon relative longitudinal movement being effected between the gripping element 20 and the frusto-conical section 18, of the mandrel 11, the gripping element 20 will be caused to expand or contract, to effect either engaging or releasing movement, as the case may be, of the teeth 22, of the gripping element 20, with respect to the inner surface of the string of tubing 2.

Each of the segmental slip sections 21 of the gripping element 20 is supported by a spring tongue 24 which, in the present instance, is in the form of a circular rod having one end 25 threaded into a suitably threaded opening in the upper end of the slip section 21, the opposite end 26 of the rod 24 being threaded into a suitably threaded opening formed in an annular flange 27 of a slip carrier 28 which surrounds and is adapted to slide on the upper cylindrical section 13 of the mandrel 11.

The slip carrier 28 comprises a cylindrical body section 29 extending vertically from the annular flange 27 and is provided at its upper end with an annular flange 30 having a radially undercut lower edge 31 and a plurality of openings 32 formed in and spaced circumferentially of the outer peripheral surface of the annular flange 30, for the purposes hereinafter set forth. The upper edge of the slip carrier 28 is beveled as shown at 33.

At the lower end of the frusto-conical section 18, the mandrel 11 is provided with an annular flange 35 and below the flange 35 the mandrel 11 is provided with a lower straight walled cylindrical section 36, of relatively smaller diameter than the flange 35 providing a shoulder 37 on the mandrel, formed by the lower face of the flange 35.

Surrounding the lower cylindrical section 36 of the mandrel 11 is a plurality of cup washers 40 each having a horizontally disposed portion 41 and a vertically disposed annular flange 42. The outer surfaces of the cup elements 40 are adapted to be forced into sealing contact with the inner surface of the string of tubing 2 to form a seal between that portion of the string of tubing lying below the obstructing device 10 and that portion of the string of tubing lying above the said obstructing device 10.

The uppermost of the cup washers 40 abuts against the shoulder 37 on the mandrel 11 and is held in position by a spacing ring 45. The lower surface of the ring 45 provides an abutment 46 for the next lower cup washer 40, one of such spacing rings 45 being provided between each adjacent pair of the cup washers 40.

The lowermost cup washer 40 is maintained in position by a locking ring 47, which is similar in construction to the spacing rings 45 with the exception that the locking ring 47 is provided with internal threads 48 that are adapted to cooperate with external threads 49 formed on the lower end of the outer surface of the lower cylindrical section 36 of the mandrel 11.

Within the bore 12 of the mandrel 11, adjacent the lower end of the lower cylindrical section 36 thereof, the said mandrel is provided with a valve or choke bushing 50 having a central bore 51 adapted to permit a flow through the obstructing device 10 under predetermined conditions. The lower end of the bore 51 of the bushing 50 is beveled, as indicated at 52, to provide a seat for a ball valve 55 which is confined in a chamber 56.

The valve chamber 56 is formed within a valve-retaining element 60, which is provided with a square opening 58 in axial alignment with the bore 51 of the valve bushing 50. The valve-retaining element 60 is internally threaded as indicated at 57 for the reception of the external threads 49 of the mandrel 11, whereby the said retaining element 60 is secured to the lower end of said mandrel.

The lower end of the mandrel 11 is counterbored and threaded as illustrated at 59 for the reception of a correspondingly threaded portion of the valve or choke bushing 50 whereby the said valve bushing is maintained within the bore 12 of the mandrel 11.

When the obstructing device 10 is used as a choke within a string of tubing the retaining element 60 and the ball valve 55 are eliminated to permit a predeterminately restricted flow from the lower part of the string of tubing to the upper part thereof, through the bore 51 of the bushing 50 and the bore 12 of the mandrel 11, the bore 51 of the bushing 50 in such case being of a predetermined diameter to produce a predetermined choking or restriction of the flow of fluid through the string of tubing 2, as clearly shown in Fig. 5.

The obstructing device 10, above described, is adapted to be introduced to, removed from, and operated within the string of tubing 2 without allowing the escape of fluid pressure therefrom by the use of surface equipment, such as shown and described in my Letters Patent No. 1,874,114.

In the present instance the lowering of the obstructing device 10 into the string of tubing 2 and the setting of said device within the string of tubing is effected by means of a setting tool 65, coupled to and carried on the lower end of an actuating or jarring device 75, which in turn is suspended within the well tubing on an ordinary form of round steel measuring line or wire 100, see Figs. 1 and 2.

The setting tool 65 comprises a hollow cylindrical body section 66 in which, at a predetermined distance above the lower open end thereof, is formed a plurality of openings 67, see Figs. 10 and 11. Located in each of the openings 67 is a relatively soft metallic plug or rivet 70 which may be of copper, brass, or any other desired material. The plugs or pins 70 project inwardly toward the center of the setting tool 65 to enter either the openings 17 of the collar 15 on the upper end of the mandrel 11 as shown in Figs. 1, 10 and 11, or to enter the openings 32 formed in the upper annular flange 30 of the slip carrier 28, as illustrated in Fig. 2. The upper end of the setting tool 65 is provided with an inwardly extending annular flange 68 forming a head having a threaded opening 69 for the reception of the lower threaded end of a central tubular element 76, forming part of the jarring device 75.

The jarring device 75 is of a telescopic construction, see Fig. 6, of which the tubular element 76 forms the inner element while an outer sleeve element 77 is provided to slide longitudinally of the inner section 76.

The outer sleeve section 77 of the telescopic jarring device 75 comprises a tubular body portion 78 having an internal annular flange 79 at its lower end which is provided with a central bore 80 through which the inner tubular section 76 is adapted to slide.

The upper surface of the internal flange 79 provides a shoulder 81 on which the lower surface of a collar 82, that is suitably secured, as by welding, to and adjacent the upper end of the inner section 76 of the said telescopic jarring device, is adapted, under certain conditions, to rest.

In the present instance, the internal flange 79 is formed at the lower end of the outer section 77 of the telescopic jarring device 75 by an annular element 83, having a vertically extending flange 84. The lower portion of the body portion 78 is reduced in diameter, as indicated at 85, to receive the flange 84 of the annular element 83, which is secured to said reduced portion of the body element by welding, as indicated at 86. The outer diameters of the vertically extending flange 84 and the annular element 83 are substantially equal to the outer diameter of the body portion 78 of said jarring device. The central bore 80 of the annular element 83 is of a diameter slightly greater than the outer diameter of the inner tubular section 76 of said jarring device, and the bore 87 of the body portion 78 of the jarring device 75 is slightly larger in diameter than the outer diameter of the collar 82 on the upper end of the inner tubular section 76 of the jarring device 75, whereby the two relatively movable sections 76 and 77 of the telescopic jarring device 75 will be axially guided in their relative movements with respect to each other.

The upper end of the body portion 78 of the outer sleeve section 77 of the telescopic jarring device 75 is counterbored and threaded as indicated at 88 for the reception of the threaded end 89 of a bail carrier 90. The bail carrier 90 is provided with an annular flange 91 providing a shoulder 92 adapted to be jammed down tightly against the surface of the upper end of the body portion 78, whereby the bail carrier 90 will be securely connected to the outer sleeve section 77 of the telescopic jarring device 75. In the upper open end of the bail carrier 90 and extending across said carrier from side to side thereof is a bail 95 to which the one end of the suspending line 100 is secured.

The said bail carrier 90 is provided at its upper end with an annular flange 96 having an under cut shoulder 97 providing means by which the jarring device may be engaged by a fishing device, forming no part of the present invention, in the event of either the suspending line 100 or the bail 95 breaking during the course of operations attending the setting or removal of the obstructing device 10, in the string of tubing 2. Such a fishing device comprises a plurality of hooks operatively connected to a suitable carrier which may be suspended within the string of tubing on the suitable line similar to the line 100, until the hooks take hold under the flange 96 of the bail carrier 90.

The assembled unit comprising the obstructing device 10, the setting tool 65 and the jarring device 75 may be run into the string of tubing 2 in either of the two ways shown in Figs. 1 and 2 respectively.

As shown in Fig. 1, the setting tool 65 is coupled at its upper end to the jarring device and at its lower end directly to the collar 15 on the upper end of the mandrel 11, the soft metal rivets or connecting plugs 70 passing through the openings 67 in the setting tool 65 and into the openings 17 formed in the collar 15, thereby rigidly securing the setting tool to the mandrel of the obstructing device.

In employing the method shown in Fig. 1, the spring tongues 24, which carry the slip elements 21, are flexed outwardly, so that the said slip elements will drag along the inside surface of the tubing. The assembly is then introduced into the upper end of the string of tubing and lowered within said tubing in the manner and by the same apparatus described in my Letters Patent No. 1,874,114 before mentioned, no flow being permitted through the string of tubing during this operation.

When the assembly has been lowered to the desired depth, by paying out the suspending wire 100 through the controlling mechanism located at the upper end of the string of tubing as described in the aforesaid Letters Patent, an upward pull exerted on the suspending wire 100 will move the mandrel 11 upwardly through the securing element 20 and the carrier 28. Since the slip elements 21 of the securing element 20 are engaging lightly against the inner wall of the tubing, raising of the mandrel 11 will cause the holding element 20 to be expanded radially, thereby jamming the slip elements 21 against the inner wall of the tubing, which sets or anchors the obstructing element 10 against any further upward movement in and with respect to the string of tubing 2.

The coupling plugs 70, which connect the mandrel 11 to the setting tool 65, have sufficient shear strength or shear resistance to enable the slip elements 21 to be firmly set against the inner wall of the tubing and the jamming of the frusto-conical section 18 of the mandrel in the tapered opening of the securing element 20 produces sufficient friction between the two to maintain the mandrel in the position to which it has been set. Sufficient force is then applied to the suspending wire 100 to cause a relative upward movement of the setting tool 65 with respect to the collar 15 of the mandrel 11, causing the connecting plugs 70 to be sheared, thereby releasing the setting tool 65 from the said mandrel and leaving the obstructing device in its set position within the string of tubing, as indicated in Figs. 4 and 5.

The shearing of the connecting lugs 70 may be effected by paying out the line 100 after the obstructing device has been set until the lower surface of the outer sleeve section 77 of the jarring device 75 comes to rest on the upper surface of the internal flange 68 of the setting tool 65, whereafter a sudden upward movement of the wire 100, and consequently the said sleeve section 77, may be effected with respect to the inner section 76 of said jarring device, whereupon the upper surface 81 of the internal flange at the lower end of the said outer sleeve section will strike the under surface of the collar 82 on the inner section of the telescopic device 75 a hammer blow of sufficient force to cause the shearing of the connecting plugs 70.

After the shearing of the plugs 70 which disconnects the setting tool from the obstructing device the said setting tool and the jarring device 75 are removed from the well by manipulation of the controlling elements at the upper end of the string of tubing, in the manner described in the aforesaid Letters Patent.

After the jarring device and setting tool have been removed from the string of tubing the valve controlling the flow of fluid through the string of tubing is opened, whereupon a flow of fluid upwardly through the string of tubing starts immediately. This flow of fluid, in trying to pass through the obstructing device when the device is used as a seal, as in Fig. 4, raises the ball valve 55 in the chamber 56 into engagement with the valve seat 52 at the lower end of the bushing 50 located at the lower end of the mandrel 11. Thus the flow of fluid through the bore 12 of the mandrel is stopped. The flow of fluid in attempting to pass around the closed obstructing device will cause the flange sections 42 of the cup washers 40, disposed around the outside of the mandrel 11, to be forced into sealing contact with the inner surface of the string of tubing, thus effectively sealing the string of tubing against a flow of fluid therethrough.

The other method of running in and setting the obstructing device 10 in the string of tubing, whether the device is to be used as a plug or choke, is to fasten the setting tool 65 to the slip carrier 28 in the manner indicated in Fig. 2, the soft metal connecting plugs 70 passing through the openings 67 in the setting tool and into the openings 32 formed in the upper annular flange 30 of the carrier 28. The entire assembly is then introduced to and lowered within the string of tubing through the controlling means at the upper end of the string of tubing, in the manner noted in the above mentioned Letters Patent, no flow of fluid through the tubing being permitted while the assembly is being lowered in the tubing.

When the assembly has been lowered to the desired depth the valve controlling the flow of fluid through the string of tubing is opened, thereby permitting a flow of fluid to start through the tubing. This upward flow of fluid through the tubing raises the mandrel 11 and causes the frusto-conical section 18 thereof to expand the securing element 20, until the slip elements 21 thereof are firmly set in gripping contact with the inner wall of the tubing, thus preventing further upward movement of the obstructing device 10, the packing cups 40 at the same time being expanded into sealing contact with the inner surface of the string of tubing, thereby preventing passage of the fluid around the obstructing device 10.

If the obstructing device 10 is being used as a tubing seal or plug, the check valve or ball 55 is used as indicated in Fig. 4 and this ball will be raised by the upward flow of fluid through the tubing into sealing contact with the valve seat 52, thus preventing a flow of fluid through the bore 12 of the mandrel 11.

If the device is being used as a plug, the pressure above the assembly is then permitted to escape immediately after the plug becomes effective to stop the flow of fluid in the string of tubing, whereafter the soft metal connecting plugs 70, by which the setting tool 65 is attached to the carrier 28, may be sheared by a relative movement between the outer slip section 77 of the jarring device 75 and the inner section 76 thereof, the lower surface of the said outer sleeve section 77 striking a hammer blow or blows against the upper surface of the internal flange of the setting tool 65, to cause the said cylindrical body section of the setting tool to move downwardly with respect to the flange 30 of the carrier 28, to shear completely the attachment plugs 70, there being sufficient clearance between the lower edge of the setting tool 65 and the upper surface of the annular flange 27 of the carrier 28 to permit of the said relative movement between the cylindrical body section of the setting tool 65 and the annular flange 30 of the carrier 28.

The downward hammering of the outer section 77 of the jarring device 75 tends to tighten the hold of the slip elements 21 on the inner surface of the tubing by the tendency to drive the said elements downwardly on the tapering surface of the frusto-conical surface 18 of the mandrel 11.

The shearing of the attachment plugs 70 in this case, as in the case above described, may be effected by an upward jarring movement of the jarring device 75, in which case the firm gripping contact of the slip elements 21 with the inner surface of the tubing will be sufficient to prevent loosening of the said elements when the jarring device is moved upwardly to shear the attachment pins 70, connecting the carrier 28 with the setting tool 65.

The jarring device and the setting tool, after shearing of the attachment plugs 70, are then removed from the string of tubing 2, after which the string of tubing itself may by proper manipulation of the control heads and other grouped equipment connected with the well casing and the string of tubing in the manner noted in the said co-pending application may be completely removed from the casing 1 or the position of the string of tubing with respect to the casing 1 may be varied to any desired extent.

If the obstructing device 10 is to be used as a choke for the string of tubing the check valve 55 and the retaining element 60 thereof are eliminated, as indicated in Fig. 5.

When setting the obstructing device, for use as a choke, the assembly is introduced into the string of tubing, in the manner above noted, and, when the desired depth is reached, a momentary flow of the well pressure through the tubing is permitted, just long enough to effect the setting of the packing cups 40 against the inner wall of the tubing, to effect a seal therebetween, and at the same time to effect an upward movement of the mandrel, whereby the slip elements 21 will be expanded against the inner wall of the tubing tightly enough to prevent jerking of the slip elements 21 out of holding contact with the inner wall of the tubing by the shearing of the connecting plugs 70, which is accomplished by the upward jarring movement of the jarring device 75, as above noted.

During the said momentary flow, the fluid will pass upwardly through the bore 12 of the mandrel and the jarring device 75, escaping from the top of the jarring device around the bail 95 carried in the bore of the cap section 90 of said jarring device.

The shearing of the connecting plug 70 is then effected and the setting tool and jarring device removed from the string of tubing in the manner above noted. After removal of the jarring device and setting tool, flow of fluid through the tubing and the obstructing device 10 may be permitted for normal operation of the well.

When it is desired to remove the obstructing device from the tubing, when the obstructing device is being used as a choke, as for the purpose of replacing the choke for one of either larger or smaller diameter, a pulling tool 110 is applied to the inner section 76 of the jarring device 75, in place of the setting tool previously attached thereto, the pulling tool 110 being applied to the telescopic element 76 in the manner indicated in Fig. 6. The assembled unit comprising the jarring device 75 and the pulling tool 110 are then lowered into the string of tubing, in the same manner as the previously inserted unit, as described above.

The pulling tool 110 comprises a head 111 having a suitably threaded axially aligned opening for the reception of the lower threaded end of the internal element 76 of the jarring device 75.

A hollow cylindrical body element 112 depends from the head 111 of the pulling tool 110 and is provided with parallel longitudinally extending saw-cuts 113, 113, which form in the lower end of the pulling tool, a plurality of hook elements 114, 114. In order to make the hook elements 114 resilient, the outer portion of those parts of the body element 112 of which the hook elements 114 are composed is milled out, as indicated at 115.

The hook elements 114 are each provided with an inwardly extending shoulder 116 radially inclined for the purpose of hooking under the radially inclined shoulder 31 of the slip carrier 28, as will be hereinafter described.

The extreme lower ends of the hooks 114 are also inclined radially as indicated at 117 and the segmental portions of the body section 112 lying intermediate the hooks 114 circumferentially of the body element 112 are beveled as indicated at 118. These intermediate segmental sections are stiffened longitudinally by the means of ribs 119, 119 shown clearly in Fig. 7.

Assuming that the obstructing device 10 is being used as a choke, as indicated in Fig. 5, and that it is desired to withdraw the device from the tubing for the purpose of replacing the choke bushing 50 with one of a different inside diameter, the assembled unit, including the jarring device 75 and pulling tool 110, is inserted in the manner described above, the assembly being lowered through the string of tubing on the wire 100 until the elements assume the position shown in Fig. 6, the beveled lower end of the pulling tool 110 passing downwardly around the upper collared end of the mandrel 11, thence downwardly over the annular flange 30 of the slip carrier 28, the upper end 33 of the flange 30 prevents the pulling tool catching thereon, until the underside of the head 111 of the pulling tool rests on the upper surface of the collar 15 of the mandrel 11; and the lower surface of the annular element 83 of the jarring device 75 rests on the upper surface of the head 111, of the pulling tool 110. As shown in Fig. 6, the hook shoulders 116 at such time are disposed some distance below the undercut shoulder 31 of the slip carrier 28. The beveled edge 16 of the collar 15 prevents the shoulders 116 catching on said collar.

In order to release the obstructing device from the tubing 2 the wire 100 is raised, which raises the outer sleeve section 77 of the jarring device 75 accordingly, lifting the lower end of said sleeve from the upper surface of the pulling tool. Sudden release of the pulling wire 100 will permit the outer sleeve section 77 to drop and thereby strike a hammer blow on the head of the pulling tool 110, which is transmitted to the upper end of the mandrel 11. The mandrel 11 in this manner is driven downwardly with respect to the slip elements 21, driving the tapered surface of the frusto-conical section 18 of the mandrel 11 downwardly through the gripping element 20, thereby permitting said element to contract through the action of the spring tongues 24, thus releasing the slip elements 21 from the inner surface of the string of tubing 2. When this takes place the whole device drops within the string of tubing, the undercut shoulder 31 of the slip carrier 28 coming to rest on the radially inclined surfaces 116 of the hooks 114 of the pulling tool 110, the mandrel 11 dropping within the slip carrier 28 until the lower beveled surface 16 of the collar 15 on the upper end of the mandrel rests on the beveled surface 33 at the upper end of the slip carrier 28. The device may then be raised through the string of tubing in the manner indicated in Fig. 3.

During this pulling operation, when the device is used as a choke, flow of pressure through the string of tubing is arrested by closing the control valves at the upper end of the string of tubing, thus the pressure within the string of tubing is equalized above and below the obstructing device, permitting the free hammering movement of the outer sleeve section of the jarring device and the dropping of the mandrel through the slip carrier under the influence of the hammering action set up by the said jarring device.

When the device has been used as a plug, in the manner indicated in Fig. 4, obviously the pressure below the obstructing device is that of the natural pressure in the well, while the pressure in the string of tubing above the obstructing device is considerably less, and probably atmospheric. It is, therefore, necessary before commencing the hammering operation by the jarring device to produce a pressure in the string of tubing above the obstructing device which will be substantially the same as the well pressure below the obstructing device. This may be accomplished by one of a number of different ways, such, for example, as by-passing well pressure from the casing head into the top of the tubing above the plug formed by the obstructing device 10, or by introducing, in the upper end of the string of tubing, a column of either oil or water which will be of sufficient height in the tubing above the ball to equalize the well pressure exerted on the underside of the ball valve 55, or by a combination of both methods noted. Obviously, any excess pressure introduced above the plug will pass downwardly around the ball check valve 55 until the pressures above and below the plug are substantially equalized. After equalization of the pressure above and below the obstructing device, within the string of tubing, has been accomplished, the jarring loose of the obstructing device may be carried out in the manner above noted.

The loosened obstructing device may then be raised to the surface and removed from the tubing by the handling apparatus above referred to.

As an example of the efficiency of the apparatus described as constituting the subject of the present invention, it will be noted that an obstructing device of the nature described has been successfully used as a plug in a well operating at a pressure of 1750 lbs. per sq. in., and held a perfect seal for a period of seventy-two hours, after which the plug was removed in a few minutes by the apparatus and method above described.

If desired the obstructive device may be provided with braking means, such, for example, as that shown in Fig. 12, to prevent the device from moving downwardly in the tubing under its own weight should the gripping element 20, for any reason, be released from gripping contact with the inside of the tubing when the pressure in the tubing above and below the obstructive device is substantially equal.

The braking means, in the present instance, comprises a plurality of shoes 130 spaced circumferentially of the carrier 28, intermediate the elements 24 which operatively connect the slip segments 21 to the lower flange 27 of the carrier 28. The shoes 130 are spring pressed radially outward into frictional contact with the inside of the tubing 2. In the present instance the shoes and their resilient pressing means are one and the same, each shoe 130 forming one part of a flat spring 131, the opposite ends 132 and 133 of which are disposed at an angle to the vertically extending shoe portion 130. The upper end 132 of the spring 131 is seated in a socket or groove 133 formed in the lower flange 27 of the carrier 28 and is held therein and thereto by a screw 134 between the head of which and the spring is a flat sided washer 135, the flat sides of which engage the side walls of the socket groove 134 and prevent the washer from turning.

When lowering the device into the string of tubing when the braking elements 130 are used the jarring device 75 is permitted to rest on the upper end of the obstructive device and the added weight of the jarring device is sufficient to overcome the braking action of the shoes 130, thus the whole assembly will descend within the tubing.

In Figs. 13 and 14, a modified form of connecting means between the slip segments 21 and the carrier 28 is illustrated. This arrangement comprises a rod 24*a* which preferably is not of a spring character but may be of cold rolled or other suitable tough but not brittle material. The upper end of the rod 24*a* is reduced as at 26*a*, and a circular flat head 136 formed on the upper end of the reduced portion. The carrier is drilled as at 137 to receive the head 136, the bore 137 being of a relatively larger diameter than the diameter of the head 136.

A slot 138 is provided in the lower wall of the bore 137, and extends to the under side of the flange 27 of the carrier to receive the reduced portion 26*a* of the rod 24*a*. The slot 138 does not extend to the outer peripheral surface of the flange 27, a portion 139 being permitted to remain to keep the rod head 136 from moving out of the bore 137.

This arrangement permits radial movement of the slip segment 21 and its connecting rod 24*a* to a predetermined extent, and permits radial swinging movement of the slip segment, the head 136 rocking in the bore 137.

Lateral swinging movement of the slip segments 21, however, is prevented by the reduced portions 26*a* of the rods 24*a* contacting with the side walls of the slots 138.

If desired the bores 137 may be radially inclined so that the rod heads 136 will, at all times, during the raising and lowering of the device, when the slip segments are not in gripping contact with the tubing, move radially inward toward the mandrel and thereby cause the slip segments to move correspondingly so that the slip segments will not contact with the tubing during the raising or lowering of the obstructive device in the tubing.

What I claim and desire to secure by Letters Patent is:

1. An obstructive device for well tubing, comprising a mandrel having a longitudinal bore extending from end to end thereof, a cylindrical section adjacent each of the respective ends of said mandrel, a frusto-conical section intermediate said cylindrical sections, an expansible gripping element on said frusto-conical section, a carrier on one of said cylindrical sections, means operatively connecting said carrier with said expansible gripping element, a collar on the carrier-supporting cylindrical section for retaining said carrier on said cylindrical section, packing means carried by the other of said cylindrical sections, a bushing threaded detachably and interchangeably into one end of said through bore and having a bore of relatively smaller diameter than the said through bore of the mandrel, and a normally open pressure closable valve detachably mounted on the mandrel in cooperative relation to said bushing.

2. An obstructive device for use in well tubing, said obstructive device comprising a mandrel having sealing means, slips associated with said mandrel and expanded for engagement with the tubing by relative movement of the mandrel with relation thereto, and means for positioning the mandrel in the well tubing comprising a jarring device and frangible means operatively connecting the jarring device and mandrel.

3. An obstructive device for use in well tubing, said obstructive device comprising a mandrel having sealing means, slips associated with said mandrel and expanded for engagement with the tubing by relative movement of the mandrel with relation thereto, and means for positioning the mandrel in the well tubing comprising a jarring device and frangible means operatively connecting the jarring device and mandrel, the frangible means directly engaging the mandrel.

4. An obstructive device for use in well tubing said obstructive device comprising a mandrel having sealing means, slips associated with said mandrel and expanded for engagement with the tubing by relative movement of the mandrel with relation thereto, and means for positioning the mandrel in the well tubing comprising a jarring device and frangible means operatively connecting the jarring device and mandrel, the frangible means being connected with the slips.

5. In a well tool comprising an obstructive device adapted to be placed in the tubing of a well, the combination of a mandrel including a frusto-conical section and an integral axially aligned cylindrical section, an expansible pipe-engaging element slidable longitudinally on said conical section, a carrier slidable longitudinally on said cylindrical section, means operatively connecting said carrier and said expansible element, said pipe engaging element being adapted under relative longitudinal movement between the mandrel and said carrier to be expanded by said conical section into anchoring engagement with the inner surface of the well tubing, packing means between the mandrel and the said inner surface of the tubing to prevent passage of fluid through the tubing around the outside of said obstructive device, said mandrel having a longitudinally extending opening for permitting a flow of fluid through said obstructive device, a bushing mounted in one end of the longitudinal opening in the mandrel and having a valve seat formed therein, a valve adapted to be seated on said valve seat, and a cap on said mandrel maintaining said valve in operative relation to said seat.

6. In a well tool comprising an obstructive device adapted to be placed in the tubing of a well, the combination of a mandrel including a frusto-conical section and an integral axially aligned cylindrical section, an expansible pipe-engaging element slidable longitudinally on said conical section, a carrier slidable longitudinally on said cylindrical section, means operatively connecting said carrier and said expansible element, said pipe-engaging element being adapted under relative longitudinal movement between the mandrel and said carrier to be expanded by said conical section into anchoring engagement with the inner surface of the well tubing, packing means between the mandrel and the said inner surface of the tubing to prevent passage of fluid through the tubing around the outside of said obstructive device, said mandrel having a longitudinally extending opening for permitting a flow of fluid through said obstructive device, said mandrel having a series of transverse openings adjacent the carrier-supporting end thereof, said carrier having a series of transverse openings above the expansible elements carried thereby, a setting tool comprising a cylindrical body adapted to pass over the said transversely apertured portions of said mandrel and said carrier, said cylindrical body having a series of transverse openings adapted to register respectively with the openings of one of the previously said series of openings, and a series of shear plugs passing respectively through the openings of said body into the series of openings registering therewith for operatively connecting the said setting tool to the obstructive device.

7. In a well tool comprising an obstructive device adapted to be placed in the tubing of a well, the combination of a mandrel including a frusto-conical section and an integral axially aligned cylindrical section, an expansible pipe-engaging element slidable longitudinally on said conical section, a carrier slidable longitudinally on said cylindrical section, means operatively connecting said carrier and said expansible element, said pipe-engaging element being adapted under relative longitudinal movement between the mandrel and said carrier to be expanded by said conical section into anchoring engagement with the inner surface of the well tubing, packing means between the mandrel and the said inner surface of the tubing to prevent passage of fluid through the tubing around the outside of said obstructive device, said mandrel having a longitudinally extending opening for permitting a flow of fluid through said obstructive device, said mandrel having a series of transverse openings adjacent the carrier-supporting end thereof, said carrier having a series of transverse openings above the expansible elements carried thereby, a setting tool comprising a cylindrical body adapted to pass over the said transversely apertured portions of said mandrel and said carrier, said cylindrical body having a series of transverse openings adapted to register respectively with the openings of one of the previously said series of openings, a series of shear plugs passing respectively through the openings of said body into the series of openings registering therewith for operatively connecting the said setting tool to the obstructive device, and a jarring device operatively connected to said setting tool for effecting the shearing of said connecting plugs.

8. In a well tool comprising an obstructive device adapted to be placed in the tubing of a well, the combination of a mandrel including a frusto-conical section and an integral axially aligned cylindrical section, an expansible pipe-engaging element slidable longitudinally on said conical section, a carrier slidable longitudinally on said cylindrical section, means operatively connecting said carrier and said expansible element, said pipe engaging element being adapted under relative longitudinal movement between the mandrel and said carrier to be expanded by said conical section into anchoring engagement with the inner surface of the well tubing, packing means between the mandrel and the said inner surface of the tubing to prevent passage of fluid through the tubing around the outside of said obstructive device, said mandrel having a longitudinally extending opening for permitting a flow of fluid through said obstructive device, a projection on said carrier, a pulling tool comprising a head adapted to rest on the upper portion of said mandrel, hook elements depending from said head around said carrier, projections on said hook elements below the projection on the carrier, and a jarring device adapted to deliver a hammer blow to said mandrel to loosen said pipe engaging element from the inner surface of said tubing whereby the projections on the hook elements will engage the projection of the carrier to support the obstructive device.

9. An obstructive device for well tubing, comprising a mandrel having a longitudinal bore extending from end to end thereof, a cylindrical section adjacent each of the respective ends of said mandrel, a frusto-conical section intermediate said cylindrical sections, an expansible pipe-engaging element on said frusto-conical section, a carrier on one of said cylindrical sections, means operatively connecting said carrier with said expansible pipe-engaging element, a collar on the carrier-supporting cylindrical section for retaining said carrier on said cylindrical section, packing means carried by the other of said cylindrical sections, a bushing threaded into one end of said through bore and having a bore of relatively smaller diameter than the said through bore of the mandrel, a ball valve adapted to be seated in the lower end of the bore of said bushing, and an apertured cap on the said mandrel providing a chamber for said ball valve.

10. An obstructive device for use within the bore of a flow string of tubing in a well having means for connecting it with a wire line running device, said obstructive device comprising a mandrel freely movable within and with respect to said tubing and including a frusto-conical section arranged with the smaller end thereof uppermost, a cylindrical section formed integral with and projecting upwardly from the said smaller end of said frusto-conical section, radially expansible pipe-engaging means freely movable on and longitudinally of said frusto-conical section, said pipe-engaging means comprising a plurality of segmental dogs, a carrier freely and slidably mounted on said cylindrical section, means for suspendingly connecting each of said segments to said carrier, means on the upper end of said cylindrical section for limiting the upward movement of said carrier on said cylindrical section, said limiting means having provision for the attachment of a setting tool, and radially expansible packing means on said mandrel below said pipe-engaging means and arranged to be expanded into sealing contact with the inner surface of the tubing and to move said mandrel upwardly with respect to said pipe-engaging means to expand the same into anchoring engagement with the inner surface of the tubing by fluid pressure trapped in the string of tubing by and below said obstructive device, said mandrel having a longitudinal bore therethrough, and means for controlling the flow of fluid through said bore, at will.

11. In a well tool including an obstructive device having means for connecting it with a wire line running device for running it into and out of a well, the combination of a mandrel including a frusto-conical section and an integral axially alined cylindrical section, an expansible pipe-engaging element slidable longitudinally on said conical section, a carrier slidable longitudinally on said cylindrical section, means operatively connecting said carrier and said expansible pipe-engaging element, said pipe-engaging element being adapted under relative longitudinal movement between the mandrel and said carrier to be expanded by said conical section into anchoring engagement with the inner surface of the well tubing, packing means between the mandrel and the said inner surface of the tubing to prevent passage of fluid through the tubing around the outside of said obstructive device, said mandrel having a longitudinally extending opening for permitting a flow of fluid through said obstructive device, and means for controlling said fluid flow, comprising a detachable and interchangeable bushing disposed in the longitudinal opening of the mandrel and having a bore of smaller area than said opening and a normally open pressure closed valve element detachably mounted on said mandrel in cooperative relation to said bushing.

12. In a well tool including an obstructive device arranged to be run into and out of a well on a wire line, the combination of a mandrel carrying an expansible sealing means to prevent flow around the mandrel, a detachably mounted choke to restrict rate of fluid passage through the mandrel, means for positioning the tool at any desired depth in the tubing, and means for engagement with a removing tool runnable on a wire line, whereby the well tool may be removed through the tubing on said wire line.

13. In a well tool including an obstructive device arranged to be run into and out of a well on a wire line, the combination of a mandrel carrying an expansible sealing means to prevent flow around the mandrel, detachable means to restrict rate of fluid passage through the mandrel, means for positioning the tool at any desired depth in the tubing, and means for engagement with a removing tool runnable on a wire line, whereby the well tool may be removed through the tubing on said wire line.

14. In a well tool comprising an obstructive device arranged to be run into and out of a well on a wire line, the combination of a mandrel carrying an expansible sealing means to prevent flow around the mandrel, a detachably mounted choke to restrict rate of fluid passage through the mandrel, means for positioning the tool at any desired depth in the tubing, and means for engagement with a removing tool runnable on a wire line, whereby the well tool may be removed through the tubing on said wire line, said gripping means being movable to a retracted position without relative rotation with respect to the mandrel whereby the tool may be removed from the tubing.

15. In a well tool including an obstructive device having means for connecting it with a wire line running device for running it into and out of a well, the combination of a mandrel including a frusto-conical section and an integral axially alined cylindrical section, an expansible gripping element slidable longitudinally on said conical section, a carrier slidable longitudinally on said cylindrical section, means operatively connecting said carrier and said expansible gripping element, said gripping element being adapted under relative longitudinal movement between the mandrel and said carrier to be expanded by said conical section into gripping contact with the inner surface of the well tubing, packing means between the mandrel and the said inner surface of the tubing to prevent passage of fluid through the tubing around the outside of said obstructive device, said mandrel having a longitudinally extending opening for permitting a flow of fluid through said obstructive device, and means detachably and interchangeably mounted on said mandrel for restricting the flow of fluid through said longitudinal opening.

16. In a well tool including an obstructive device having means for connecting it with a wire line running device for running it into and out of a well, the combination of a mandrel including a frusto-conical section and an integral axially alined cylindrical section, an expansible pipe-engaging element slidable longitudinally on said conical section, a carrier slidable longitudinally on said cylindrical section, means operatively connecting said carrier and said expansible pipe-engaging element, said pipe-engaging element being adapted under relative longitudinal movement between the mandrel and said carrier to be expanded by said conical section into anchoring engagement with the inner surface of the well tubing, packing means between the mandrel and the said inner surface of the tubing to prevent passage of fluid through the tubing around the outside of said obstructive device, said mandrel having a longitudinally extending opening for permitting a flow of fluid through said obstructive device, and means for restricting and stopping said fluid flow, at will, comprising a detachable and interchangeable bushing disposed in the longitudinal opening of the mandrel and having a bore of smaller area than said opening and a normally open pressure closed valve element detachably mounted on said mandrel in cooperative relation to said bushing.

17. In a well tool including an obstructive device having means for connecting it with a wire line running device for running it into and out of a well, the combination of a mandrel including a frusto-conical section and an integral axially alined cylindrical section, an expansible pipe engaging element slidable longitudinally on said conical section, a carrier slidable longitudinally on said cylindrical section, means suspendingly connecting said carrier and said expansible pipe engaging element, said pipe engaging element being adapted under relative longitudinal movement between the mandrel and said carrier to be expanded by said conical section into anchoring engagement with the inner surface of the well tubing, packing means between the mandrel and the said inner surface of the tubing to prevent passage of fluid through the tubing around the outside of said obstructive device, said mandrel having a longitudinally extending opening for permitting a flow of fluid through said obstructive device, a valve seat at one end of the longitudinal opening in the mandrel, a valve adapted to be seated on said valve seat, and a cap having an opening and located on said mandrel for maintaining said valve in operative relation to said seat.

18. An obstructive device for use in a well tubing having means for connecting it with a wire line running device, including a mandrel having a longitudinal bore extending from end to end thereof, a cylindrical section adjacent each of the respective ends of said mandrel, a frusto-conical section intermediate said cylindrical sections, an expansible pipe-engaging element on said frusto-conical section, a carrier on one of said cylindrical sections, means operatively connecting said carrier with said expansible pipe-engaging element, packing means carried by the other of said cylindrical sections, and means for restricting the flow of fluid through the bore of the mandrel.

19. An obstructive device for use in a well tubing having means for connecting it with a wire line running device, including a mandrel having a longitudinal bore extending from end to end thereof, a cylindrical section adjacent each of the respective ends of said mandrel, a frusto-conical section intermediate said cylindrical sections, an expansible pipe-engaging element on said frusto-conical section, a carrier on one of said cylindrical sections, means operatively connecting said carrier with said expansible pipe-engaging element, a collar on the carrier-supporting cylindrical section for retaining said carrier on said cylindrical section, packing means carried by the other of said cylindrical sections, and detachable and interchangeable means for restricting the fluid flow through said longitudinal bore of the mandrel.

20. An obstructive device for use in a well tubing having means for connecting it with a wire line running device, including a mandrel having a longitudinal bore extending from end to end thereof, a cylindrical section adjacent each of the respective ends of said mandrel, a frusto-conical section intermediate said cylindrical sections, an expansible pipe-engaging element on said frusto-conical section, a carrier on one of said cylindrical sections, means operatively connecting said carrier with said expansible pipe-engaging element, packing means carried by the other of said cylindrical sections, a valve seat at the lower end of the bore of the mandrel, a ball valve adapted to be seated in said valve seat to seal the bore of the mandrel against upward flow therethrough, and an apertured cap on the said mandrel providing a chamber for said ball valve.

21. An obstructive device for use within the bore of a flow string of tubing in a well having means for connecting it with a wire line running device, said obstructive device including a mandrel freely movable within and with respect to said tubing and comprising a frusto-conical section arranged with the smaller end thereof uppermost, a cylindrical section formed integral with and projecting upwardly from the said smaller end of said frusto-conical section, radially expansible pipe-engaging means freely movable on and longitudinally of said frusto-conical section, a carrier for and operatively connected to said pipe-engaging means and freely slidably mounted on said cylindrical section, said carrier having provision for the attachment thereto of a withdrawing tool, and radially expansible packing means on said mandrel below said pipe-engaging means and arranged to be expanded into sealing contact with the inner surface of the tubing and to move said mandrel upwardly with respect to said pipe-engaging means to expand the same into anchoring engagement with the inner surface of the tubing by fluid pressure trapped in the string of tubing by and below said obstructive device, said mandrel having a longitudinal bore therethrough, and means detachably and interchangeably applied to said mandrel for restricting the flow through the bore of the mandrel.

22. An obstructive device for use within the bore of a flow string of tubing in a well having means for connecting it with a wire line running device, said obstructive device including, a mandrel freely movable within and with respect to said tubing and comprising a frusto-conical section arranged with the smaller end thereof uppermost, a cylindrical section formed integral with and projecting upwardly from the said smaller end of said frusto-conical section, radially expansible pipe-engaging means freely movable on and longitudinally of said frusto-conical section, a carrier for and operatively connected to said pipe-engaging means and freely slidably mounted on said cylindrical section, said carrier having an external annular undercut shoulder for the engagement of a withdrawing tool, means on the upper end of said cylindrical section for limiting the upward movement of said carrier on said cylindrical section, and radially expansible packing means on said mandrel below said pipe-engaging means and arranged to be expanded into sealing contact with the inner surface of the tubing and to move said mandrel upwardly with respect to said pipe-engaging means to expand the same into anchoring engagement with the inner surface of the tubing by fluid pressure trapped in the string of tubing by and below said obstructive device, said mandrel having a longitudinal bore therethrough and means for restricting the flow of fluid through the bore of the mandrel.

23. An obstructive device for use within the bore of a flow string of tubing in a well and having means for engagement with raising and lowering mechanism for removing the device from the tubing, said obstructive device including, a mandrel freely movable within and with respect to said tubing and comprising a middle frusto-conical section arranged with the smaller end thereof uppermost, an upper cylindrical section formed integral with and projecting upwardly from the said smaller end of said frusto-conical section, radially expansible pipe-engaging means freely movable on and longitudinally of said frusto-conical section, a carrier for and operatively connected to said pipe-engaging means and freely slidably mounted on said cylindrical section, said carrier having provision for the attachment of a withdrawing tool, means on the upper end of said cylindrical section for limiting the upward movement of said carrier on said cylindrical section, a lower cylindrical section formed integral with and projecting downwardly from the larger end of said frusto-conical section, and radially expansible packing means fixedly secured on the said lower cylindrical section of said mandrel below said radially expansible pipe-engaging means and arranged to be expanded into sealing contact with the inner surface of the tubing and to move said mandrel upwardly with respect to said pipe-engaging means to expand the latter into anchoring engagement with the inner surface of the tubing by fluid pressure trapped in the string of tubing by and below said obstructive device, said mandrel having a longitudinal bore therethrough and means for restricting and stopping the flow of fluid through said bore, at will.

24. An obstructive device for use within the bore of a flow string of tubing in a well and having means for engagement with raising and lowering mechanism for removing the device from the tubing, said obstructive device including, a mandrel freely movable within and with respect to said tubing and comprising a frusto-conical section arranged with the smaller end thereof uppermost, an upper cylindrical section formed integral with and projecting upwardly from the said smaller end of said frusto-conical section, radially expansible pipe-engaging means freely movable on and longitudinally of said frusto-conical section, a carrier for and operatively connected to said pipe-engaging means and freely slidably mounted on said cylindrical section, said carrier having provision for the attachment of a withdrawing tool, means on the upper end of said cylindrical section for limiting the upward movement of said carrier on said cylindrical section, a lower cylindrical section formed integral with and projecting downwardly from the larger end of said frusto-conical section, and radially expansible packing means fixedly secured on the said lower cylindrical section of said mandrel below said pipe-engaging means and arranged to be expanded into sealing contact with the inner surface of the tubing and to move said mandrel upwardly with respect to said pipe-engaging means to expand the same into anchoring engagement with the inner surface of the tubing by fluid pressure trapped in the string of tubing by and below said obstructive device, said packing means comprising a plurality of relatively spaced inverted cup washers having annular flanges projecting downwardly for trapping said fluid pressure therebelow, said mandrel having a longitudinal bore therethrough and means for restricting the flow of fluid through the bore of said mandrel and stopping the flow, at will.

25. An obstructive device for use in a well tubing having means for connecting it with a wire line running device, including, a mandrel having sealing means, dogs associated with said mandrel and expanded for engagement with the tubing by relative movement of the mandrel with relation thereto, and means for positioning and operatively setting the device in the well tubing comprising a jarring device and means releasable by actuation of the jarring device operatively connecting the jarring device and mandrel.

26. An obstructive device for use in a well tubing having means for connecting it with a wire line running device, including, a mandrel having sealing means, dogs associated with said mandrel and expanded for engagement with the tubing by relative movement of the mandrel with relation thereto, and means for positioning and operatively setting the device in the well tubing comprising a jarring device and means releasable by actuation of the jarring device operatively connecting the jarring device and mandrel by direct engagement of the parts.

27. An obstructive device for use in a well tubing having means for connecting it with a wire line running device, including, a mandrel having sealing means, dogs associated with said mandrel and expanded for engagement with the tubing by relative movement of the mandrel with relation thereto, and means for positioning and operatively setting the device in the well tubing comprising a jarring device and means releasable by actuation of the jarring device operatively connecting the jarring device and mandrel, said means being connected with the dogs.

28. An obstructive device for use in a well tubing having means for connecting it with a wire line running device including, a tubular mandrel having sealing means for sealing off the tubing, tubing engaging elements associated with said mandrel and arranged to be expanded for engagement with the tubing by relative movement of said mandrel with relation to said tubing engaging elements whereby to anchor the device, a carrier suspendingly supporting said tubing engaging elements and movable longitudinally on said mandrel, means on said mandrel for limiting the upward movement of said carrier, an annular projection on said carrier, means for releasing and pulling said device from the tubing including an engaging element for engaging the annular projection of said carrier and moving the carrier longitudinally with respect to said mandrel, and means for running and setting said device in the tubing on a wire line.

29. An obstructive device for use in a well tubing having means for connecting it with a wire line running device including a mandrel having a frusto-conical section and an integral axially alined cylindrical section, an expansible pipe-engaging element slidable longitudinally on said conical section, a carrier slidable longitudinally on said cylindrical section, means operatively connecting said carrier and said expansible element, said pipe-engaging element being adapted under relative longitudinal movement between the mandrel and said carrier to be expanded by said conical section into anchoring engagement with the inner surface of the well tubing, packing means between the mandrel and the said inner surface of the tubing to prevent passage of fluid through the tubing around the outside of said obstructive device, said mandrel having a longitudinally extending opening for permitting a flow of fluid through said obstructive device, and means for restricting the flow of fluid through the longitudinal opening of the mandrel.

30. An obstructive device for use in a well tubing having means for connecting it with a wire line running device, including a mandrel having a longitudinal bore extending from end to end thereof, a cylindrical section adjacent each of the respective ends of said mandrel, a frusto-conical section intermediate said cylindrical sections, an expansible pipe-engaging element on said frusto-conical section, a carrier on one of said cylindrical sections, means operatively connecting said carrier with said expansible pipe-engaging element, a collar on the carrier-supporting cylindrical section for retaining said carrier on said cylindrical section, packing means carried by the other of said cylindrical sections, and a pressure operated valve cooperatively mounted on the mandrel for sealing the bore thereof against an upward flow of fluid therethrough.

HERBERT C. OTIS.